United States Patent
Balma, Jr. et al.

(10) Patent No.: US 7,259,329 B1
(45) Date of Patent: Aug. 21, 2007

(54) TEXTURED, READY-TO-PAINT COVERS FOR OUTLETS

(76) Inventors: Dallas J. Balma, Jr., 5561 Big River Dr., The Colony, TX (US) 75056; Christopher S. Taylor, 1202 Padre Cir., Allen, TX (US) 75013

( * ) Notice: Subject to any disclaimer, the term of this patent is extended or adjusted under 35 U.S.C. 154(b) by 0 days.

(21) Appl. No.: 11/407,309

(22) Filed: Apr. 19, 2006

(51) Int. Cl.
*H02G 3/14* (2006.01)

(52) U.S. Cl. .......................... 174/66; 174/67; 220/241; 428/141

(58) Field of Classification Search ................. 174/66, 174/67, 135; 220/241, 242, 3.8; 428/141, 428/142
See application file for complete search history.

(56) References Cited

U.S. PATENT DOCUMENTS

| | | |
|---|---|---|
| 2,980,283 A | 4/1961 | Bentsen |
| 3,953,933 A | 5/1976 | Goldstein |
| D243,887 S | 3/1977 | Levin |
| D244,510 S | 5/1977 | Grieb |
| 4,731,511 A | 3/1988 | Steinhilber et al. |
| D308,814 S | 6/1990 | Kintigos et al. |
| D346,949 S | 5/1994 | Comerci et al. |
| 5,375,728 A * | 12/1994 | West .......................... 220/3.8 |
| 5,563,373 A * | 10/1996 | Doroslovac .................. 174/67 |
| D392,873 S | 3/1998 | Scherer et al. |
| D396,401 S | 7/1998 | Christie |
| 6,005,190 A | 12/1999 | Stark et al. |
| 6,160,219 A | 12/2000 | Malthy et al. |
| 6,607,621 B1 * | 8/2003 | Swanson ..................... 156/94 |
| 6,740,813 B1 | 5/2004 | Gretz |
| 2003/0106703 A1 | 6/2003 | Wilson |

* cited by examiner

*Primary Examiner*—Dhiru R. Patel
(74) *Attorney, Agent, or Firm*—Drude Faulconer

(57) ABSTRACT

A pre-textured, pre-primed cover for an opening a wall/ceiling which has been finished with a particular known, texture pattern. The cover is molded from a plastic material wherein the surface of the cover has a particular, known texture pattern formed integrally therein. The particular pattern is selected from a group of texture patterns which are well known in the trade. After the cover is molded, a primer is sprayed thereon so that the textured surface will readily accept and retain paint such as that used to paint the wall.

13 Claims, 1 Drawing Sheet

TEXTURED, READY-TO-PAINT COVERS FOR OUTLETS

TECHNICAL FIELD

The present invention relates to molded, textured ready-to-paint cover plates for wall openings and the like and in one of its aspects relates to cover plates for most any type of opening through a wall or ceiling of a room or the like wherein the plates are molded to have a particular known texture thereon and which has a pre-primed finish for painting.

BACKGROUND OF THE INVENTION

Cover plates have long been used to cover the openings in walls, ceiling, and/or floors which are necessary when installing electrical switches, electrical power outlets, registers/returns for air conditioners, vents, trim rings for can lights, etc. These covers may be made from a variety of materials, e.g. plastics, woods, glass, metals, etc., and may be finished in a variety of colors and designs. For example, a particular cover may be molded from a variety of different colored plastics to closely match or contrast with certain painted or wall-papered walls or the like. Likewise, special covers, e.g. wood grained or brass, gold, or silver colored, are available for other decors and applications.

In some instances, a plain cover, e.g. plain, white plastic, can be customized by covering the cover with the same wall paper or other wall covering as is used on the wall on which the cover is to be mounted so that the cover blends in with the wall. Likewise, a plain plastic cover may be painted, either before or after installation, with same paint as is used on the wall to again blend in with the finished wall. Painting the cover will provide the cover with the same color as the wall but since most walls are "textured" and then painted, the un-textured cover will still appear distinct from the wall when mounted thereon and gives an unpleasing appearance to some. Also, common interior paint does not adhere well to the slick cover and has a tendency to chip or peel off the cover during the operational life of the cover. This is also true if one attempts to merely texture the cover(s) with the same texturing compound as used on the wall before painting the cover since the bond between the slick cover and the texturing compound is iffy at best and will likely badly chip off the cover in short order.

Accordingly, it should be evident that it would be a beneficial to the decorating industry to have a variety of "pre-textured" covers available which are formed with the permanent textured surfaces molded therein which correspond to the different respective texture patterns commonly used by professional finishers. This is especially true where the "pre-textured" covers are also "pre-primed" so that the covers can readily be painted with the same paint as that used in finishing a room.

SUMMARY OF THE INVENTION

The present invention provides a pre-textured, pre-primed cover for a respective opening normally required for installing electrical switches, outlets, air ducts, can light trim, and the like, in a wall/ceiling which has been finished with a particular known, texture pattern.

More specifically, the present invention provides pre-textured, pre-primed cover plates for covering those openings in a wall/ceiling, or the like which are present after various switches, outlets, etc. have been installed. In accordance with the present invention, a particular cover is molded from a plastic material much in the same way as previous covers of this type were formed except the surface of the present cover has a particular, known texture pattern formed integrally therein. A particular pattern is selected from a group of texture patterns (e.g. "smooth"; "splatter drag" or "knock down"; "light to medium orange peel"; "medium to heavy orange peel"; "light skip trowel"; "heavy skip trowel", etc.) which are all well known in the finishing trade and which can readily be reproduced on walls/ceilings by those skilled in this trade upon request.

The cover is removed from the mold and the pre-textured surface is treated to remove all oils or the like. Next, a primer is sprayed onto the cover to produce a textured surface which readily accepts and retains paint which, in turn, can be applied before or after the cover is installed.

The covers of the present invention will be available in a variety of shapes and textured surfaces so that a particular cover can be selected to substantially match the identical textured finish on a particular wall/ceiling. By being pre-primed, the cover can easily be painted with the same paint that is used to paint the wall/ceiling whereby an eye pleasing, substantially uninterpreted textured finish.

BRIEF DESCRIPTION OF THE DRAWINGS

The actual construction operation, and apparent advantages of the present invention will be better understood by referring to the drawings, not necessarily to scale, in which like numerals identify like parts and in which.

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DESCRIPTION OF THE PREFERRED EMBODIMENTS

Figure 1:
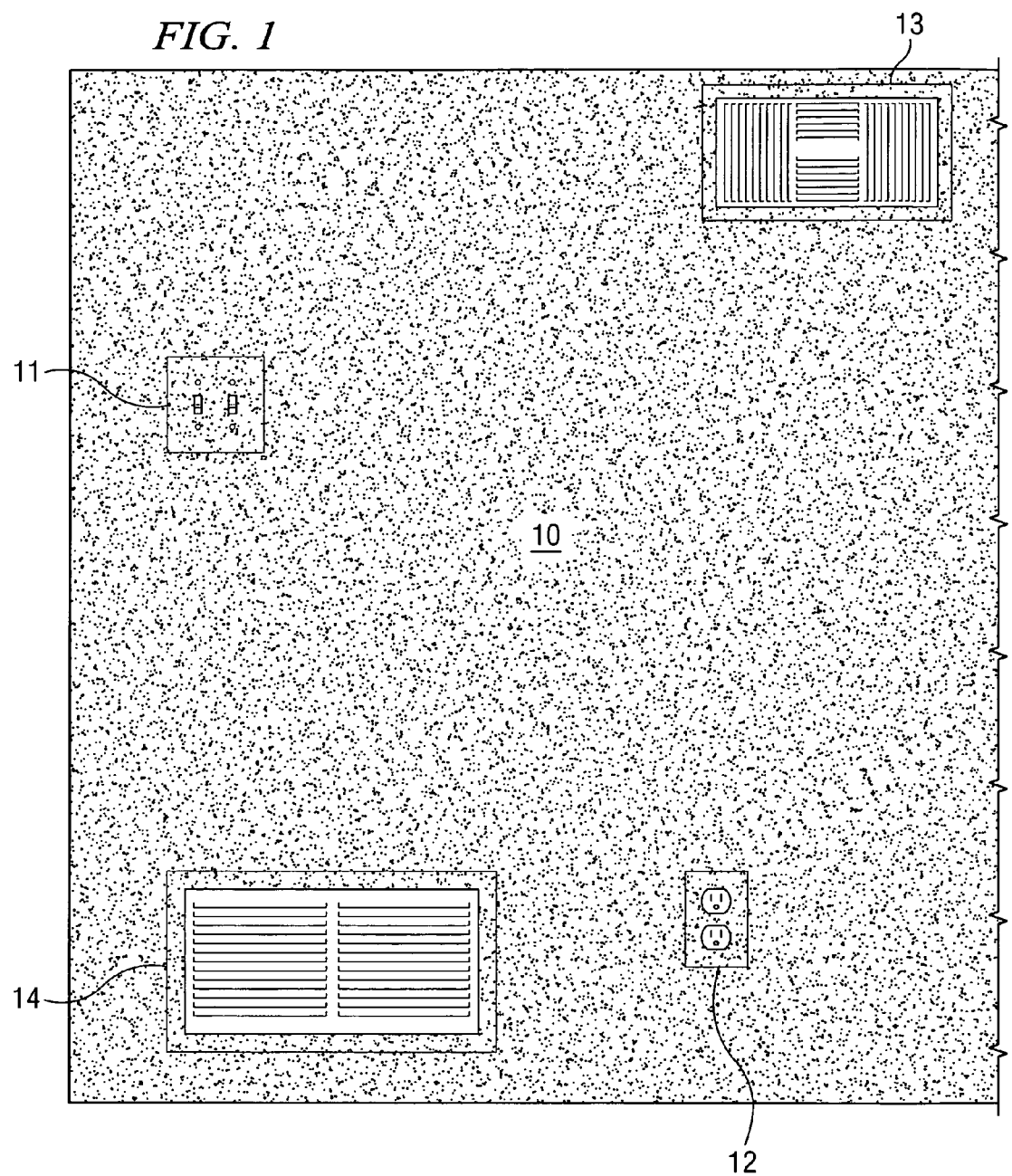
FIG. 1 is a perspective view of part of a wall or the like illustrating some of the different openings on which respective covers in accordance with the present invention can be installed.
Figure 2:
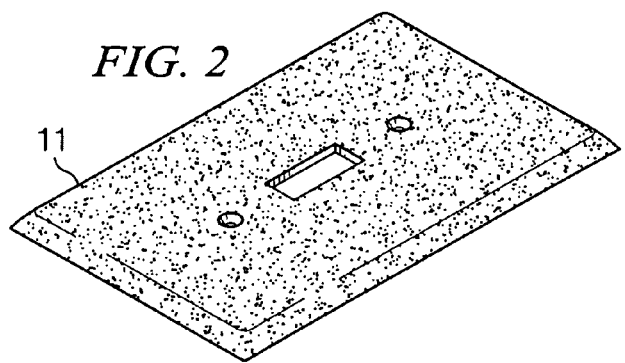
FIG. 2 is an enlarged, perspective view of one of the covers shown in FIG. 1.

Referring more particularly to the drawings, FIGS. 1 and 2 illustrate the textured, pre-primed covers of the present invention. As used throughout the specification and claims herein, the term "cover" is intended to include all cover plates, including "blanks", which are used to cover any respective openings in walls/ceilings or the like which remain after electrical switches, outlets, etc. are installed. Such covers may be square, rectangular, round, oval, or any other shape which may be required by a particular situation.

FIG. 1 illustrates the positioning of some of the typical cover plates in accordance with the present invention on a portion of a wall 10 or the like. For example, as shown, a particular cover 11 covers the opening for an electrical on/off switch, cover 12 covers the opening for electrical outlet sockets, cover 13 covers the opening for an outlet register for an air conditioning duct, and cover 14 covers an opening for an air return duct. Further, it should be understood that the present invention also is intended to include any and all other covers (not shown for the sake of brevity) used for similar installations that may be made through a wall or the like (e.g. custom covers for telephone and/or cable jack outlets, blanks for unused openings, trim rings or the like for can lights, etc.).

As universally known, it is common to "texture" a wall and/or ceiling (hereinafter collectively referred to as "wall") before painting. As will be fully understood in the art, the wall is normally textured by troweling a mortar-type compound, commonly called "joint compound", onto the wall in any one of several different, well-known distinct and recognizable texture patterns. The wall is then painted after the joint compound dries and cures. In typical prior art applications, the covers used to cover these types of openings in a wall either (a) are standard plastic covers (i.e. plain, pre-colored or covers having particular designs imprinted thereon) which substantially match or contrast with the textured wall finish or (b) are made of some particular material (e.g. metal, wood, etc.) which provides a esthetic contrast with the wall finish. In some instances, the plain covers are painted with the same paint as that used on the wall but the lack of texture on the covers is evident to the naked eye and the over-all effect may detract from the final desired finish of the wall. Further, the paint does not bond well with the covers so that the paint has a tendency to rub or peel off after a relatively short period of time, leaving an undesired eyesore on the wall.

In accordance with the present invention, the present covers are molded so that their respective outer exposed surface and edges match the same industry recognized texture pattern as that used on the wall 10. Several standard texture patterns are well known in the finishing trade and are commonly identified as "smooth"; "splatter drag" or "knock down"; "light to medium orange peel"; "medium to heavy orange peel"; "light skip trowel"; "heavy skip trowel", etc. All of these patterns, as well as others, are known to professional "finishers" and can be readily, uniformly, and accurately reproduced on a particular wall upon a specific request from a customer.

While the present covers may be formed by any appropriate known technique, preferably the covers are formed by known injection molding processes using known plastics basically the same as used in manufacturing previously known covers of this type. For example, a typical molding process begins by creating a mold which replicates the selected texture pattern to be molded. Preferably, all exposed surfaces (top and all four edges) of the plate are formed with the desired texture pattern thereon. The mold may be made from a copper alloy or the like which is melted and poured into a preformed cavity which has the desired texture pattern therein.

The liquid copper takes the shape and desired texture pattern of the cover and hardens to form a template which, in turn, is used in molding that particular cover; (e.g. a switch cover having an "orange peel" pattern; an outlet cover having a "knock-down" pattern, and so on). That is, a separate mold will be provided to form each type of cover (e.g. cover for single or multiple switches, covers for different configurations of switches/outlets, larger covers for registers/returns, etc.), and each mold will have a respective, specific texture pattern (e.g. orange peel, etc.) as may be required for a particular finishing operation.

As will be understood in the art, any appropriate, known plastic material commonly used for molding covers of this type can be used to mold the present covers, e.g. a polymer known as ABS (acrylonitrile-butadiene styrene). After each cover is removed from the mold, if needed, the textured surface and edges of the cover are treated or otherwise conditioned to remove any oils or the like that may be present thereon. A "primer" is then sprayed onto the exposed surfaces so that the textured surface and edges will readily accept and retain any commonly used paint that might be applied thereto. Any appropriate primer can be used that will readily adhere to the textured surface and accept common paint can be used; e.g. a liquid resin/dimethyl benzene mixture.

In operation, the covers in FIG. 1 can be painted before or after they are installed on wall 10. Since the texture pattern on the covers uniformly match the texture pattern on wall 10 and can be painted with the same paint as used on the wall, the covers blend into the wall thereby giving a highly esthetic appearance to the discerning eye. Also, by producing and stocking groups of standard-use covers with each group being comprised of covers having a variety of commonly-used texturing patterns, a professional finisher can easily match a cover to any standard texture pattern requested by his/her customer.

What is claimed is:

1. A molded pre-textured, pre-primed, removable cover for an opening in a wall where said wall has been textured with a distinct pattern, said cover having a pre-textured surface formed integral thereon during the molding of said cover, said pre-textured surface on said cover being the same said pattern which matches said distinct pattern on said wall; and a primer applied to said pre-textured surface of said cover at the time of manufacture of said cover, said primer being adapted to readily accept paint.

2. The cover of claim 1 wherein said primer comprises:

a mixture of liquid resin and dimethyl benzene.

3. The cover of claim 1 wherein said primer is sprayed onto said pre-textured surface after said surface has been molded.

4. The cover of claim 1 wherein said cover is molded from a plastic material.

5. The cover of claim 4 wherein said plastic material is comprised of acrylonitrile-butadiene styrene.

6. The cover of claim 1 wherein said pattern on said pre-textured surface is selected from a group of known, reproducible texture patterns used for finishing walls.

7. The cover of claim 1 wherein said pattern is selected from the group of reproducible texture patterns used for finishing walls, said group comprising:

smooth, splatter drag, knock down, light to medium orange peel, and medium to heavy orange peel.

8. A method of constructing a pre-textured, removable cover for an opening in a wall, said cover having a particular texture pattern on the surface thereon, said method comprising:

creating a mold replicating said particular texture pattern;

supplying a plastic material to said mold to form said cover having said particular texture pattern on the surface thereof;

removing said cover from said mold; and applying a primer to said cover to allow said textured surface of said cover to readily accept common interior paints.

9. The method of claim 8 including:

cleaning said cover after removing said cover from said mold and before applying said primer.

10. The method of claim 8 wherein said primer is sprayed onto said cover.

11. The method of claim 10 wherein said plastic material comprises:

acrylonitrile-butadiene styrene and said primer comprises:

a mixture of liquid resin and dimethyl benzene.

12. The method of claim 11 wherein said pattern is selected from a group of texture patterns known and readily reproducible in the wall finishing trade.

13. The method of claim 12 wherein said group from which said pattern is selected comprises:

smooth, splatter drag, knock down, light to medium orange peel, and medium to heavy orange peel.

\* \* \* \* \*